United States Patent [19]

Shulenberger

[11] Patent Number: 5,122,804
[45] Date of Patent: * Jun. 16, 1992

[54] METHOD AND APPARATUS FOR GROUND RADAR INFORMATION DISPLAY SYSTEM

[75] Inventor: Arthur M. Shulenberger, Brisbane, Calif.

[73] Assignee: Radar Data Systems, Inc., Hayward, Calif.

[*] Notice: The portion of the term of this patent subsequent to Jul. 16, 2008 has been disclaimed.

[21] Appl. No.: 714,286

[22] Filed: Jun. 12, 1991

Related U.S. Application Data

[63] Continuation of Ser. No. 126,879, Nov. 30, 1987, Pat. No. 5,032,841.

[51] Int. Cl.⁵ .................................................. G01S 9/56
[52] U.S. Cl. .......................................... 342/37; 342/32
[58] Field of Search ........................................ 342/37, 32

[56] References Cited

U.S. PATENT DOCUMENTS

| | | | |
|---|---|---|---|
| 3,623,090 | 11/1971 | Gilbert | 343/6 |
| 3,668,403 | 6/1972 | Meilander | 235/150.23 |
| 3,766,552 | 6/1973 | Hajduk | 343/6 |
| 3,900,840 | 8/1975 | Gibbon et al. | 342/32 |
| 4,161,729 | 7/1979 | Schneider | 343/6.5 R |
| 4,197,538 | 4/1980 | Stocker | 342/37 |
| 4,293,857 | 10/1981 | Baldwin | 343/6.5 R |
| 4,454,510 | 6/1984 | Grow | 342/32 |
| 5,032,841 | 7/1991 | Shulenberger | 342/37 |

Primary Examiner—Mark Hellner
Attorney, Agent, or Firm—Townsend and Townsend

[57] ABSTRACT

Disclosed herein is a method and apparatus for a ground radar and information display system for commercial and general aviation. The method includes processing raw data from the presently existing ATCRBS system, duplicating the raw data and sending it to an auxiliary computer, filtering out non-positional messages of the raw data, encoding the raw data into a data block and transmitting the data block to a display facility, where it is decoded and displayed. The apparatus of the invention includes and auxiliary ground computer and a smaller on-board computer for processing the data block.

5 Claims, 7 Drawing Sheets

| MESSAGE DESCRIPTION | BITS PER MESSAGE | # OF MESSAGES | TOTAL # OF BITS |
|---|---|---|---|
| RADAR SITE I/D | 16 | 1 | 16 |
| NUMBER OF RADAR TRACKS (Nr) | 16 | 1 | 16 |
| NUMBER OF MODE A TRACKS (Na) | 16 | 1 | 16 |
| NUMBER OF MODE C TRACKS (Nc) | 16 | 1 | 16 |
| NUMBER OF MODE S TRACKS (Ns) | 16 | 1 | 16 |
| RADAR TRACK MESSAGE | 60 | Nr | Nr * 60 |
| MODE A TRACK MESSAGE | 72 | Na | Na * 72 |
| MODE C TRACK MESSAGE | 96 | Nc | Nc * 96 |
| MODE S TRACK MESSAGE | 120 | Ns | Ns * 120 |
| WEATHER MAP REGION # | 8 | 1 | 8 |
| WEATHER PICTURE OF REGION | 32768 | 1 | 32768 |
| TEXTUAL MESSAGES | 4096 | 1 | 4096 |

FIG. 5

| RADAR TRACK MESSAGE FORMAT | | | |
|---|---|---|---|
| DESCRIPTION OF DATA BLOCK | NUMBER OF BITS | UNIT | RANGE OF VALUES |
| TRACK # | 12 | | |
| N/S POSITION | 16 | 1/64 NM | ±512 |
| E/W POSITION | 16 | 1/64 NM | ±512 |
| TRACK DIRECTION | 8 | 360/256 DEG | 0 TO 255 |
| TRACK GROUND SPEED | 8 | 10 KNOTS | 0 TO 2550 |
| TOTAL : | 60 | | |

FIG. 6

| MODE A TRACK MESSAGE FORMAT | | | |
|---|---|---|---|
| DESCRIPTION OF DATA BLOCK | NUMBER OF BITS | UNIT | RANGE OF VALUES |
| TRACK # | 12 | | |
| MODE A I/D # | 12 | | |
| N/S POSITION | 16 | 1/64 NM | ± 512 |
| E/W POSITION | 16 | 1/64 NM | ± 512 |
| TRACK DIRECTION | 8 | 360/256 DEG | 0 TO 255 |
| TRACK GROUND SPEED | 8 | 10 KNOTS | 0 TO 2550 |
| TOTAL : | 72 | | |

FIG. 7

| MODE C TRACK MESSAGE FORMAT | | | |
|---|---|---|---|
| DESCRIPTION OF DATA BLOCK | NUMBER OF BITS | UNIT | RANGE OF VALUES |
| TRACK # | 12 | | |
| MODE C I/D # | 12 | | |
| N/S POSITION | 16 | 1/64 NM | ± 512 |
| E/W POSITION | 16 | 1/64 NM | ± 512 |
| ALTITUDE | 12 | 100 FEET | 0 TO 409,600' |
| VERTICAL SPEED | 12 | 5 FT/SEC | ± 10,240 |
| TRACK DIRECTION | 8 | 360/256 DEG | 0 TO 255 |
| TRACK GROUND SPEED | 8 | 10 KNOTS | 0 TO 2550 |
| TOTAL : | 96 | | |

FIG. 8

| MODE S TRACK MESSAGE FORMAT | | | |
|---|---|---|---|
| DESCRIPTION OF DATA BLOCK | NUMBER OF BITS | UNIT | RANGE OF VALUES |
| TRACK # | 12 | | |
| MODE C I/D # | 12 | | |
| MODE S I/D # | 24 | | |
| N/S POSITION | 16 | 1/64 NM | ±512 |
| E/W POSITION | 16 | 1/64 NM | ±512 |
| ALTITUDE | 12 | 100 FEET | 0 TO 409,600' |
| VERTICAL SPEED | 12 | 5 FT/SEC | ±10,240 |
| TRACK DIRECTION | 8 | 360/256 DEG | 0 TO 255 |
| TRACK GROUND SPEED | 8 | 10 KNOTS | 0 TO 2550 |
| TOTAL : | 120 | | |

FIG. 9  ↖84

METHOD AND APPARATUS FOR GROUND RADAR INFORMATION DISPLAY SYSTEM

This is a continuation of application Ser. No. 07/126,879 filed No. 30, 1987, now U.S. Pat. No. 5,032,841.

FIELD OF THE INVENTION

This invention relates to radar surveillance and information gathering and sending systems and more particularly to such systems which include an auxiliary computer for ground information gathering and an auxiliary computer for an on-board receiving unit.

BACKGROUND OF THE INVENTION

The subject of air traffic control and collision avoidance schemes has drawn much public and private concern. Currently, the U.S. Government through the Federal Aviation Administration (FAA) operates a nationwide system of ground stations which includes a search radar unit and a radar beacon unit which jointly and independently feed a common digitizer with information about aircraft in the vicinity. This system is known as the air traffic control radar beacon system (ATCRBS).

The information gathered by ATCRBS is sent to a host computer via a series of high speed modems. The host computer also known as the central computer complex (CCC) or air traffic control center (ATCC) host computer. The ATCC host computer then computes navigational and air traffic information to the air traffic controllers' display terminal. The air traffic controller then relays this information to aircraft in the immediate vicinity. More detailed information about the ATCRBS is found in Stocker, U.S. Pat. No. 4,197,538, col. 1 11. 23-46 and Schneider, U.S. Pat. No. 4,161,729, col. 1, 11. 14-25 cited parts of which are both incorporated herein by reference.

The search radar unit gathers information on all aircraft in the vicinity by sending out radio waves and keeping track of the reflections from same. Thus the search radar finds out whether an aircraft is in the vicinity and its azimuth and range. The radar beacon unit duplicates the azimuth and range information of the search radar and interrogates the transponder on-board an aircraft obtaining the aircraft transponder identification number as well as other information. This is standard FAA format.

The information from both units is fed in parallel to the common digitizer where it is placed in a form suitable for transmission to the ATCC. Along with position information the common digitizer adds system overhead such as idle words to separate each interrogation.

The FAA is about to invoke rules which will make the TCAS-I and TCAS-II (Traffic Collision and Avoidance System) mandatory on all common carriers major airline carriers having more than 20 passengers. The TCAS-II system is estimated to cost private airlines $200,000 for each unit. Each on-board unit alone will cost approximately $100,000. The public cost of TCAS-II is estimated at over $800 million.

Problems other than cost associated with the proposed TCAS-II are that the interrogation and reply channels of ATCRBS will become overloaded. The TCAS-II system goes through an "all-call" sequence to determine transponder identification of all transponders in the vicinity. After getting the transponder identification number, TCAS-II adds the number to the role call and all identified Mode S transponders are locked out future "all call" sequences. However, Mode A and Mode C transponder can not be locked out and will continue to respond to the "all call" sequence, adding to the system burden.

Additionally, aircraft without transponders will not be detected by the system. There are approximately 5,000 such general aviation aircraft. In the recent past these type of aircraft have been involved in a significant number of near misses or actual collisions.

Finally, TCAS-II will be of limited range. This will make it exceedingly difficult for the aircraft to make horizontal maneuvers. Greater range is needed to give pilots more to make such maneuvers.

Others have proposed less expensive alternatives to TCAS-II. For example, Crow in U.S. Pat. No. 4,454,510 proposes using a two-way data communication link between each of a plurality of controlled aircraft and the ATCC host computer. While this system is advantageous over TCAS-II because it does not add signals to the ATCRBS environment, it still relays on the ATCC host computer, placing an unwanted burden on the critical system. When traffic control is needed most will be when traffic is the heaviest. This precisely when the ATCC host computer will be taxed to its limit. That makes any further load placed on the ATCC critical which could cause even Crow to fail when it will be needed the most.

Baldwin in U.S. Pat. No. 4,293,857 proposes an aircraft avoidance system which allows aircraft to communicate directly with one another. This system will require the expensive Mode S transponders to be aboard each aircraft. In addition, Baldwin requires each aircraft to having relatively large computers on-board to do the required calculations and to do them fast enough to make the system work. This will mean substantially increased expenses for each aircraft as well as additional weight. Both weight and expense are mentioned as problems in Crow.

Schneider in U.S. Pat. No. 4,161,729 proposes the addition of indicator control panel and a separate receiver and decoder between the transponder and the antenna of the aircraft. Again this means the addition of a substantial expense to each aircraft and the ability to receive only information from participating aircraft.

Stocker in U.S. Pat. No. 4,197,538 discloses a de-centralized system where aircraft communicate directly with one another via a separate on-board FM broadcast and receiving station. Raw data from the common digitizer is broadcast to each of the participating aircraft. Each participating aircraft must then encode the data for display on the participating aircraft's screen. Stocker thus requires expensive additional on-board equipment as well as placing the additional requirement of the ATCC host computer to transmit to the participating aircraft.

Meilander in U.S. Pat. No. 3,668,403 discloses a complex method and algorithm for vehicle traffic control.

Although many have attempted to solve the long felt need discussed in the above references, problems of complexity, high cost and complete data communication remain. What is needed is an aircraft traffic control system that will work well with the existing ATCRBS as well as with future systems. This system should supplement and not place any additional burden on the ATCC host computer. In fact, the preferred system will be invisible to the ATCC host computer. The preferred system should supply even general aviation with complete data on other aircraft in the vicinity.

SUMMARY OF THE INVENTION

It is an object of this invention to provide an apparatus and method for a ground radar and information display system which is compatible with the presently existing ATCRBS components.

It is a further object of this invention to provide a ground radar and information display system which provides information to all participating GRIDS aircraft for avoiding collisions and to assist in performing accurate navigational functions.

It is a further object of this invention to provide such a GRIDS network to small airlines and general aviation.

In accordance with the above objects and those that will be mentioned and will become apparent below, the method of the ground radar and information display system in accordance with this invention includes:

acquiring data from the common digitizer of the presently existing ATCRBS without affecting the transmission of the data to the ATCC host computer, wherein azimuth and range information is acquired for all aircraft being tracked by the ATCRBS;

creating a plot message by filtering out non-positional data from the common database;

converting polar coordinates of the plot message to rectangular coordinates;

creating and encoding a data block from the plot message containing data on all aircraft being tracked by the ATC facility by using an auxiliary computer means;

reading the data block into temporary storage;

transmitting the data block to receiving stations;

receiving the data block at a receiving station;

decoding the data block; and displaying the data in human readable form.

The preferred method of the invention includes the step of repeating the process over and over again to gain updated information on the display. The preferred method also includes storing the plot message in alternating files of RAM, assigning a time signature to the plot messages and then reading the files alternatively into a data computer based on the time signatures. Thus a continuous stream of data is fed into the data computer.

To facilitate the method of the invention, an apparatus which for presently existing Air Traffic Control facilities (ATC) which includes a search radar unit, a radar beacon unit and a common digitizer is provided which comprises:

an auxiliary portion of the ground facility, including;

means for acquiring data from the common digitizer;

means for filtering out non-positional data from the common digitizer and temporarily storing the positional data;

auxiliary ground computer means for performing data conversion and encoding on the positional data and temporarily storing the converted data in a block; and radio means for transmitting the encoded data block; and a display facility, including;

means for receiving the encoded data block;

computer means for decoding the signal; and display means for displaying information from the ground station, whereby information from the ground station can be displayed and updated at the receiving unit without affecting any of the presently existing facilities.

The preferred apparatus in accordance with the invention includes a 32 bit microprocessor and a 32 bit channel. This insures expeditious handling of the data. The preferred apparatus further includes data stream splitter which is optically connected to the common digitizer. This insures that no matter what occurs with the auxiliary portion of the ground apparatus that the original data stream will proceed unaffected.

It is an advantage of this invention to provide all aircraft including general aviation with an affordable means of obtaining information and navigational data on aircraft in the vicinity.

It is an additional advantage of this invention to provide a GRIDS network which is compatible and invisible to the presently existing and future ATCRBS.

Further objects and advantages of this invention will become obvious with reference to the detailed description of the invention below, wherein:

BRIEF DESCRIPTION OF THE DRAWING

FIG. 5 illustrates the format of the data block.

FIG. 6 illustrates the format of the radar track message.

FIG. 7 illustrates the format of a Mode A transponder track message.

FIG. 8 illustrates the format of a Mode C transponder track message.

FIG. 9 illustrates the format of a Mode S transponder track message.

DETAILED DESCRIPTION OF THE INVENTION

Figure 1:
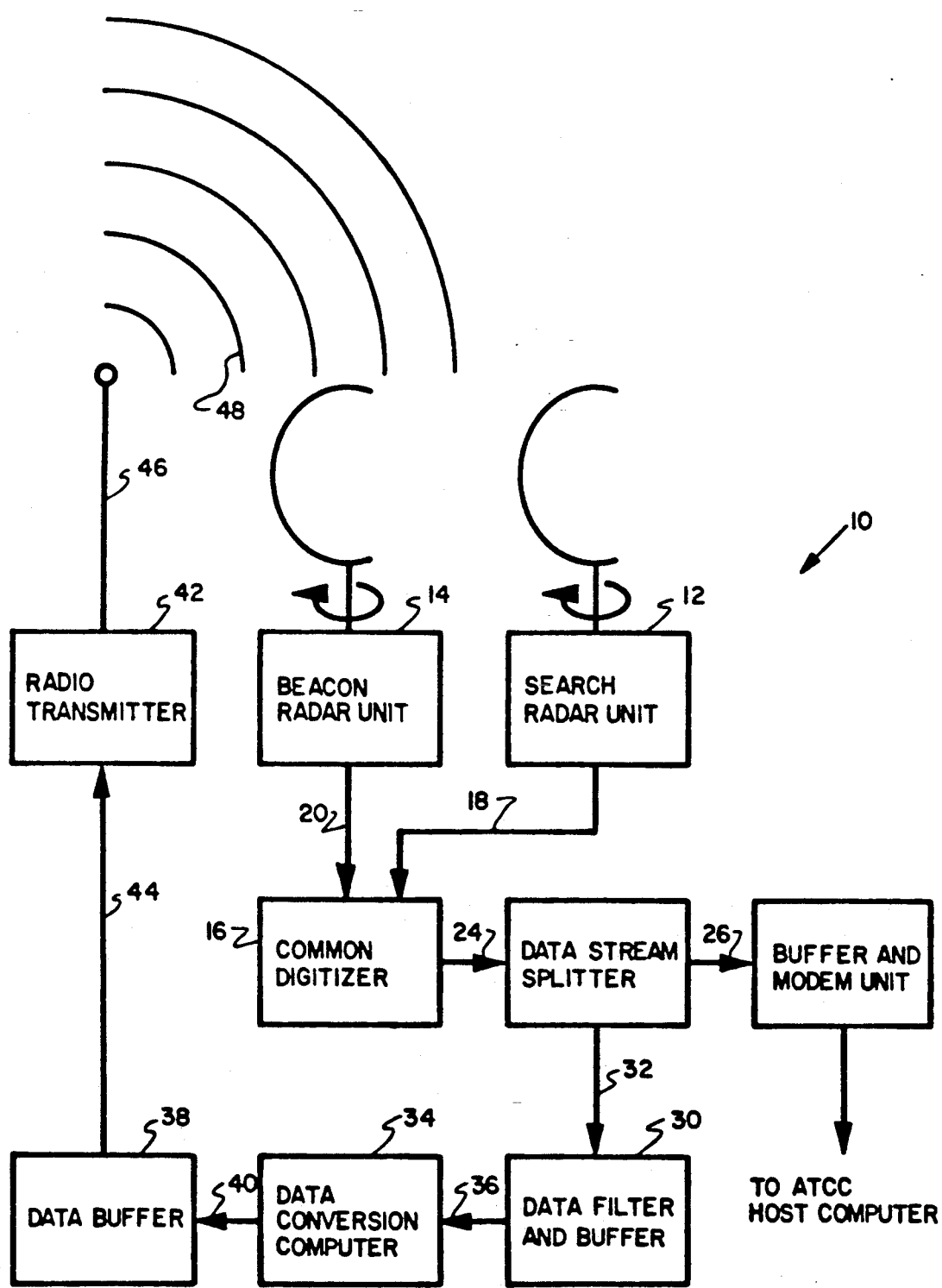
FIG. 1 is a schematic representation of the ground facility of the apparatus of the ground radar and information display system (GRIDS) in accordance with this invention.

The invention will now be described with reference to the drawing wherein like reference characters designate like or corresponding parts throughout the several views. Referring particularly to FIG. 1, there is shown the ground portion of the ground radar information display system (GRIDS) in accordance with this invention, generally denoted by the numeral 10.

The ground portion 10 includes the presently existing portion of the ATC center (ATCRBS) and an auxiliary portion of the ground facility in accordance with this invention. The presently existing portion of the ATC center includes an information gathering function comprising a search radar unit 12 and the beacon radar unit 14. The search radar unit 12 gathers information by sending out a radar signal and keeping track of the reflections. It will be noted that the aircraft reflecting the search radar signal need not have any special instruments or any type of transponder for information to be gathered. The information gathered by the search radar unit is the fact that an aircraft is in the vicinity, its range and azimuth from the transmission point. Upon successive sweeps of the search radar unit 14, the bearing vector can be determined.

The beacon radar unit 14 interrogates each of the aircraft in the vicinity through their on-board transponder. Of course, if the aircraft has no transponder, then no response will be forthcoming. There are presently two types of transponders in wide spread use, Mode A and Mode C. The Mode A is an older type of transponder which replies with its transponder identification number but without any information concerning its altitude. The Mode C transponder will reply to the beacon radar unit 14 interrogatories with its encoded altitude as well as its transponder identification number. The transponder. identification number is also known as the "4096" number. This number is changed according to the air traffic controller at time of take-off by changing a setting either electronically or by manual dials on the side of the transponder.

Another type of transponder is the Mode S transponder which is currently about to be implemented by the FAA. The Mode S transponder replies to the beacon radar unit 14 only when discreetly addressed. This means that the beacon radar unit 14 must know the aircraft's transponder identification number and address the transponder accordingly before it will respond. This varies from the Mode A or C transponder in that they may be addressed by an "all-calls" interrogation simultaneously. The Mode S transponder responds to the beacon radar unit 14 with the same information as the Mode C transponder.

The information from the search radar unit 12 and the beacon radar unit 14 is fed in parallel to a common digitizer 16 through lines 18 and 20, respectively. The common digitizer 16 is a subsystem of the presently existing ATCRBS, which converts the encoded analog responses from the search radar unit 14 and beacon radar unit 14 into a digital output. The digitized information is then sent to an ATCC host computer through a buffer and modem unit in the presently existing ATCRBS.

In the GRIDS system of the invention, the digitized information known as the raw data string is sent to a data stream splitter 22 over line 24. The signal containing the raw data string is duplicated with the original signal continuing over line 26 to the buffer and modem 28 of the presently existing ATCRBS. As described above, the information continues to the ATCC host computer. Preferably the data stream splitter 22 is coupled to the ATCC host computer by an optical coupler. Using the optical coupler, even if there was rare feed back by the auxiliary ground components of GRIDS, no harm would come to the presently existing ATCC system.

The duplicated signal containing the raw data string is then fed into the data filter and buffer 30 over line 32. As will be described more fully with respect to FIG. 3, the data filter and buffer 30 filters the raw data string to eliminate all non-positional data messages. Thus, the system overhead which includes idle words as well as real time quality control is taken out of the raw data string. After filtering out the non-positional messages, a plot message is created. The plot message is stored temporarily in the buffer portion of the data filter and buffer 30 and subsequently read into a data conversion computer 34 over line 36.

In the preferred embodiment, the data filter and buffer 30 has a first set of RAM and a second of RAM. The data filter and buffer 30 creates a first file, File 1 in the first set of RAM and a second file, File 2 in the second set of RAM. After the raw data string is filtered a time signature is added to create the plot message. The time signature is equal to the actual present time less the time when the raw data was first acquired by ATCRBS. The raw data is processed and stored in File 1 until a predetermined time limit is reached. Typically, this time limit will be less than one full sweep of the radar. The data filter and buffer 30 continues to process the raw data but now stores it in File 2. Upon the data conversion computer's 34 instruction File 1 and File 2 are read into the computer 34.

Figure 4:
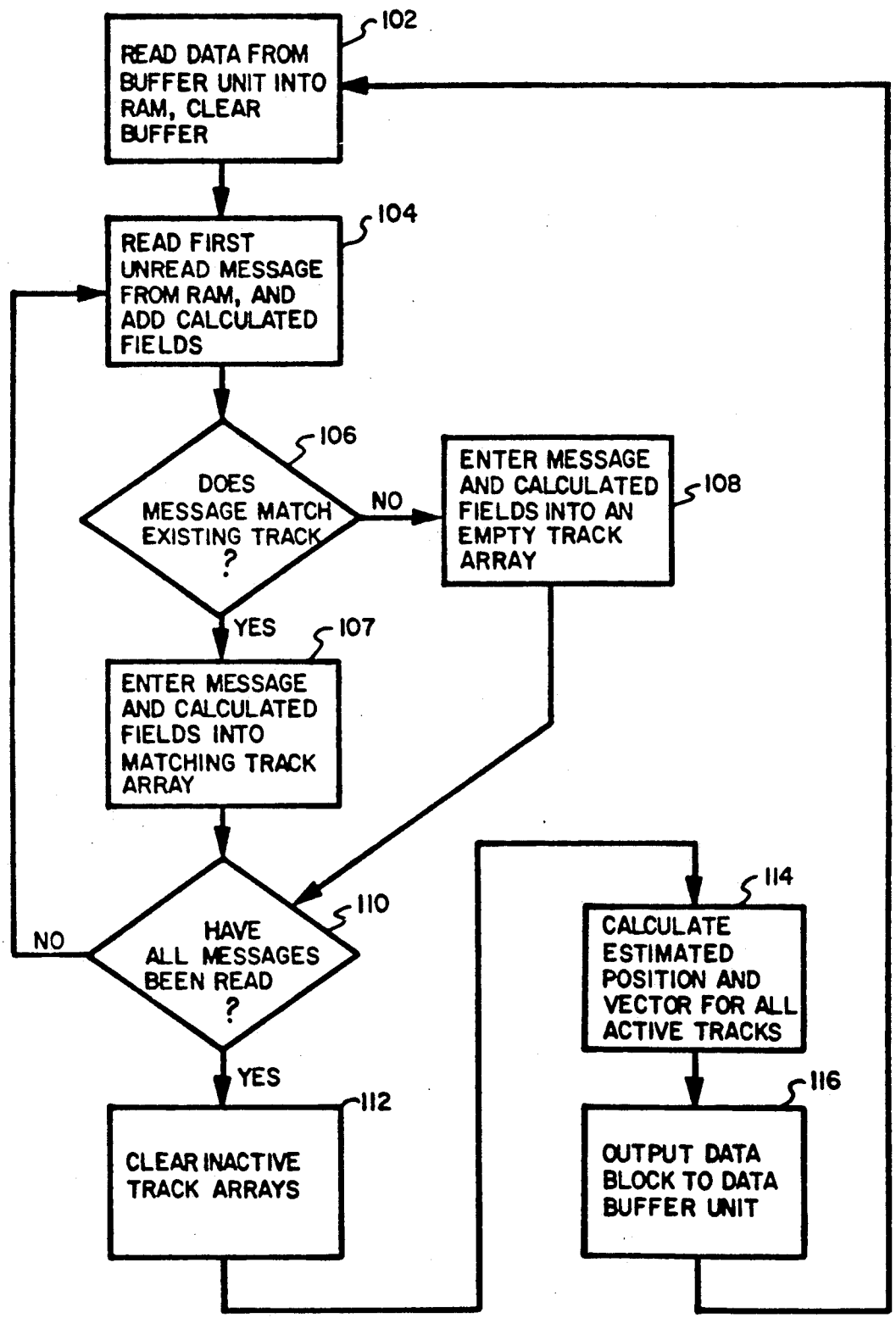
FIG. 4 is a flow chart of the data conversion computer of GRIDS.

As will be described more fully with reference to FIG. 4, the data conversion computer 34 converts the polar coordinates of the plot message into equivalent rectangular coordinates. The data conversion computer 34 also creates a data block 41 by encoding the plot message with updated and extrapolated data. A more detailed description of the block of data is set forth below with reference to FIG. 5.

The encoded block of data is then sent to data buffer 38 over line 40. The data block 41 is temporarily stored in data buffer 38 until it is sent to a radio transmitter 42 over line 44. The data conversion computer 34 controls the temporary storage of the data block 41. The data conversion computer 34 is preferably a 32 bit microcomputer having a 32 bit bus. The 32 bit micro-computer preferably contains a 32 bit microprocessor for example Intel Corporation's 80386 or Motorola's 680XX family of processors are sufficient.

The radio transmitter 42 is preferably an FM transmitter and the signal is then modulated and sent out to receiving stations over an antenna 46 as illustrated in schematic by transmission waves 48. The data block 41 in sent in bursts so that a complete data block 41 is sent with each burst. The preferred transmission rate is 100K Baud to insure that multiple complete blocks of data are transmitted during each sweep of the ATCRBS.

Thus, the auxiliary portion of the ground facility in accordance with this invention is invisible to the presently existing ATCRBS. The auxiliary portion of the ground facility is inexpensive. It is estimated that the total cost of all the new components of the preferred embodiment is $20,000.

Figure 2:
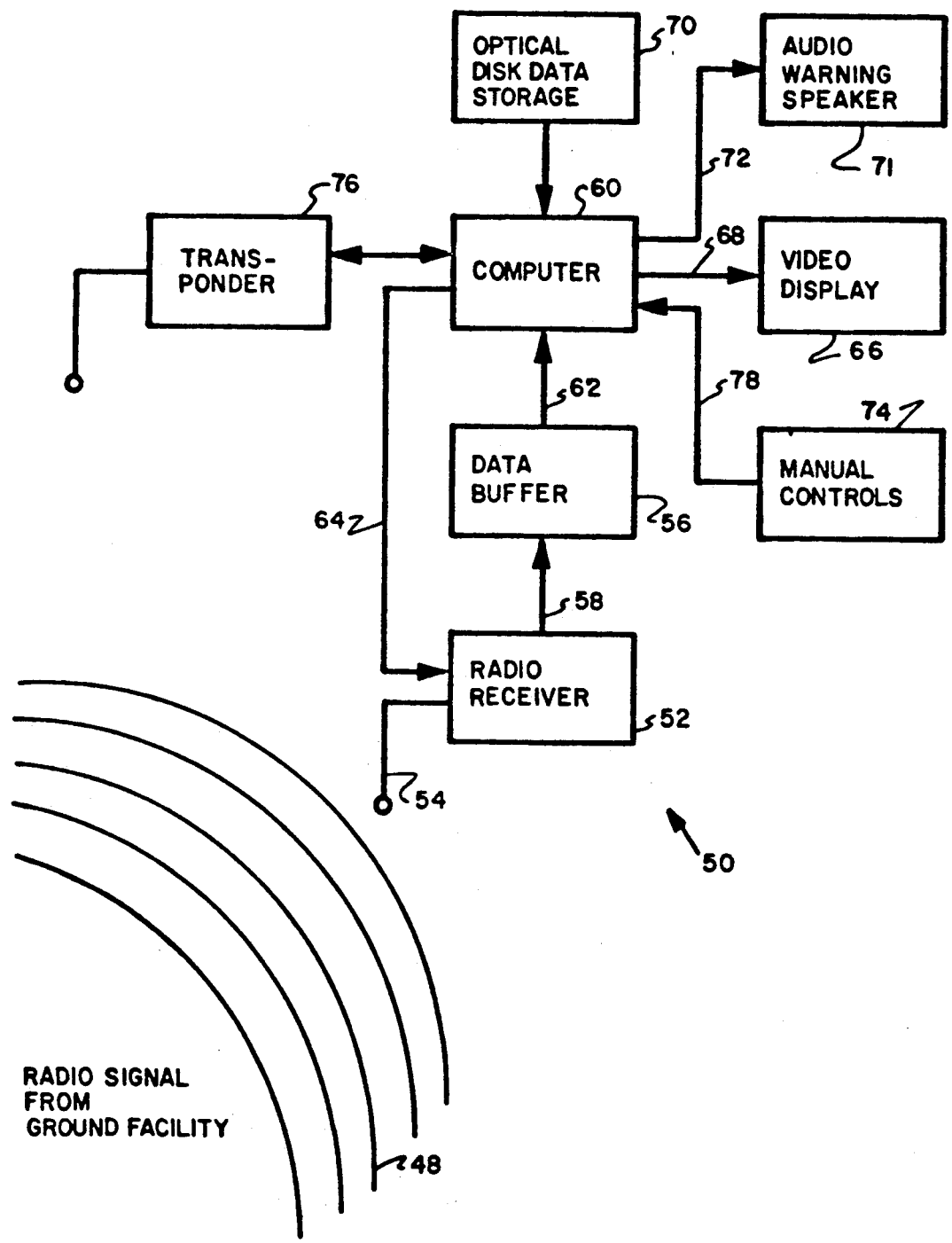
FIG. 2 is a schematic representation of the on-board components of the apparatus of the ground radar and information display system in accordance with this invention.

The display facility of the invention, generally denoted by the numeral 50 will now be described with reference to FIG. 2. A radio receiver 52 receives the transmission waves 48 from the ground facility through an antenna 54. The radio receiver 52 matches the transmitter 42. Thus in the preferred embodiment the radio receiver 52 is an FM receiver having a demodulator. After receipt, the data block 41 is sent to the on-board data buffer 56 over line 58. Upon a control signal from an on-board computer 60, the data block 41 in temporary storage in on-board data buffer 56 is read into computer 60 over line 62.

The radio transmitter 42 is preferably multi-channeled. Thus transmissions of radio transmitter 42 do not interfere with adjacent transmitters since they can be tuned to a different channel. For example, in the preferred embodiment, the transmitter 42 has 20 channels which can be received by the receiver 52. The preferred receiver 52 is similarly equipped. The on-board computer 60 is directly connected to the receiver in the preferred embodiment by control line 64. The on-board computer 60 controls to which of the 20 channels the receiver is tuned and is capable of scanning the entire band width until the transmitting signal is found.

The on-board computer 60 decodes the data block 41 into a form which is suitable for display on a video display terminal 66 by transmission of the decoded signal over line 68. With the addition of an on-board optical disk data storage unit 70 which communicates with on-board computer 60 over line 72, many more advantages of the invention may be realized. For example, navigational information such as maps of a terminal facility, routes, and standard and instrument departure procedures can be easily stored on the optical disks. At appropriate time the desired disk is inserted in the on-board optical disk data storage unit 70. The information is fed into on-board computer 60 and the decoded block of data may be superimposed on the map or route or desired information at the video display terminal 66. The program for decoding the data block 41 is illustrated in Appendix A.

The preferred embodiment of the invention includes a Mode S transponder which can provide data links with other Mode S equipped aircraft. An audio warning speaker 70 is connected to the on-board computer 60 over line 72 to alert the flight of such warnings. All TCAS-II aircraft will be required to have the Mode S transponder if the currently proposed final regulations of the FAA are adopted. This will apply equally to TCAS-III systems as well. Thus the invention is presently compatible with the existing ATCRBS and the future proposed systems as well.

Manual controls 74 are provided for tuning a transponder 76 to the correct 4096 number. In the preferred operation, the on-board computer 60 automatically sets the transponder 76 4096 number. However, manual controls may override the number and serve other functions such as an acknowledgement of alert messages. The manual controls are also connected to the on-board computer 60 over line 78 to promote ease of operation.

The transponder 76 is connected to the on-board computer 60 over a two-way communication line 80. The two-way communication line serves to connect on-board computer to Mode S data link. The display facility of the invention 50 may be installed on aircraft having either Mode A, Mode C or Mode S transponders. Of course certain advantages of GRIDS are not present if a Mode A or Mode C transponder is selected. For example, without a Mode S transponder the audio warning would not be communicated to the aircraft. If the aircraft contains a Mode A transponder the data block 41 will be different as will be described in more detail with respect to FIGS. 7-9.

In the preferred embodiment, the on-board computer 60 collects the information from the instruments of the aircraft (not shown) and utilizes that information to establish a match with a track in the data block.

Figure 3:
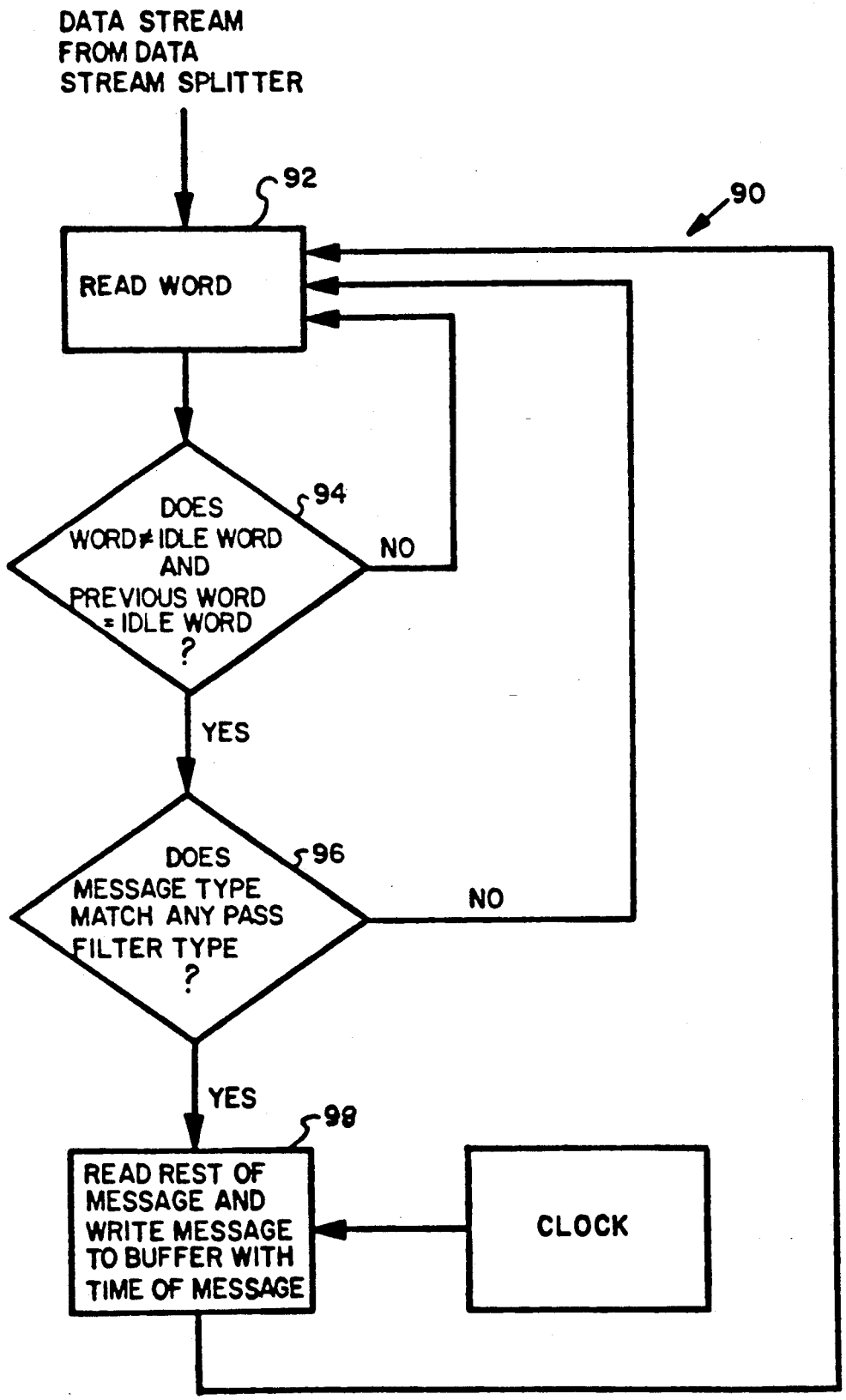
FIG. 3 is a flow chart of the data filter and buffer unit of GRIDS.

The detailed operation of the data filter and buffer 30 will now be described with reference to the flow chart 90 of FIG. 3. The raw data is encoded by the common digitizer 16 in a series of words and then read into the data stream splitter 22. After the duplication, the duplicated signal is sent to the data filter and buffer 30 where the raw data string from the common digitizer 16 is filtered and written into the buffer portion of data filter and buffer 30 as shown by block 98.

The encoding is an FAA standard format. Each message is separated by at least one idle word. And each data message is always preceded by at least on idle word. Each encoded word is read as illustrated by a block 92. Idle words have an even parity and are the only encoded words to have such a parity, so they are easily detectable.

The first decisional phrase of a decision block 94 requires each word to be read until the present word is not an idle word. When the first data word appears it will according to FAA standard format be preceded by an idle word. The second decisional phrase of decision block 94 requires present word to be preceded by an idle word. Thus the first word of each data message will be sent to the next decisional block 96.

In FAA standard format the first word of a data message indicates whether the message is position, weather or part of system overhead. The data filter and buffer 30 then asks whether the message is of the type to be passed. If the pass identifying word is not in the message, the next word is read. If pass identifying word is in the message the remaining message is read as illustrated by block 98. It will be noted that the message is read according to the same format above.

The message is read if it is in the middle because when the middle of a message is reached when the present word is a data word and will have been preceded by another data word. Thus reading continues because the previous word was not an idle work as required by the second part of the decision block. The reading of the message is stopped only when a data word is preceded by an idle word. Thus, reading the message stops when the first word of the next message is reached.

A clock 100 assigns a time signature to each message when the message is written to the buffer portion of data filter and buffer 30. This allows GRIDS to keep track of the time for each data message as described earlier.

The data conversion computer 34 will now be described in detail with reference to FIG. 4. As illustrated by block 102, the filtered data is read from the data filter and buffer 30 and the buffer is cleared. The first unread message is read from RAM (either File 1 or File 2) depending on which was read last. The new data is calculated and added to previously calculated fields as illustrated by block 104.

If the message matches an existing track, each aircraft in the vicinity on the ATCRBS has its own track, then the message and the calculated is entered and into a matching track array as illustrated by decisional block 106 and block 107. The track array is initialized when the data conversion computer 34 is powered up. As illustrated by decisional block 106 and block 108, if the message does not match an existing track, the message is entered on an empty track array.

After entering the unread message, the data filter and buffer 30 asks if all of the messages from either File 1 of File 2 have been read, as illustrated by a decisional block 110. If not all the messages have been read from the file, the reading continues until the file is empty. Note that as a new aircraft approaches the facility, the tracking array will be opened with the first message, however, subsequent messages will form part of an established tracking array.

When the file is empty the inactive tracks are cleared, as illustrated by block 112. Thus if an aircraft leaves the ATCRBS vicinity it will no longer be carried by the auxiliary computer system in accordance with invention.

Extrapolation is then performed by the data conversion computer 34 using the unread data from the file, as illustrated by block 114. A best fit line estimates position and vector for all tracks is then performed by the data conversion computer 34. This information then defines the data block 41. The data block 41 contains complete information on all aircraft being tracked by the ATCRBS.

The data block 41 is then read into the data buffer 38 for transmission as described earlier, as illustrated by block 116. The next file is read and the unread data processed as described above. In this way the data being display by the video display terminal 66 is constantly updated.

As illustrated by FIG. 5, a data block 41 comprises the radar site I/D as a 16 bit word, the number of radar tracks as a 16 bit word, the number of Mode A transponder tracks as a 16 bit word, the number of Mode C transponder tracks as a 16 bit word and the number of Mode S transponder tracks as a 16 bit word, which are self explanatory. The data block 41 additionally comprises the radar track message which is the information on all aircraft not carrying a transponder of any type as a 60 bit word, the information on all aircraft carrying a Mode A transponder as a 72 bit word, the information on all aircraft carrying a Mode C transponder as a 96 bit word and the information on all aircraft carrying a Mode S transponder as a 120 bit word.

The data block 41 of the preferred embodiment also includes weather information including the weather map region number as an 8 bit word and weather picture for the region. The maximum allowable bits for the weather picture are 32,768. It is not anticipated that the complete weather picture will be either transmitted or displayed on a single pass. Rather the information will be transmitted and displayed over the course of the transmission of several data blocks 41.

The program for creating the data block 41 is illustrated in Appendix B.

With respect to FIGS. 6-9, there is illustrated the format and content of the radar track message 43, the Mode A transponder track message 73, the Mode C transponder track message 82 and the Mode S track message 84, respectively. As will be appreciated more extensive track information is gathered from Mode C and Mode S transponder than from either the radar track message or the Mode A track message.

IN USE

It will be appreciated that GRIDS as set forth in this disclosure would work in an acceptable manner if just one ground facility were in existence with just one aircraft having the on-board display system recited above. However, it will be appreciated that other features of GRIDS as set forth above are possible if many and preferably all of the present ATCRBS sites were equipped with GRIDS. For example, if the more than 200 ATCRBS sites were each installed with GRIDS a fail safe network would occur. If one or even several of the ATCRBS sites were to lose their ATCC host computer the GRIDS network would continue to work. For example, if the aircraft were in the vicinity of Site 1 and it failed, then the aircraft would use GRIDS to get position and vector information all aircraft in the vicinity by using a combination of the closest available and working ATCRBS sites. This promotes safety in the event that TCAS-II is eventually adopted and is overloaded despite arguments to the contrary. GRIDS would continue to work in a TCAS-II environment since it does not rely on the ATCC host computer and it is compatible with Mode S transponders, although not dependent on same.

A 4096 number setting of 1200 (base 8) is now used by aircraft not operating under ATCC control. Numbers in the range of 1201 (base 8) to 1277 (base 8) can be used by GRIDS equipped aircraft that are not under ATCC control. The on-board GRIDS computer 60 can then adjust the 4096 number within this range to find a discreet number to aid in self identification of a track in the data block 41.

While the foregoing detailed description has described several embodiments of the ground radar and information display system in accordance with this invention (GRIDS), it is to be understood that the above description is illustrative only and not limiting of the disclosed invention. Particularly, any type of auxiliary computer may be used for example a work station or even an 8 bit microcomputer is within the scope of this invention. Thus the invention is to be limited only be the claims as set forth below.

APPENDIX A

```
00010 REM
00020 REM                                          QUIKPLOT 11/5/87D
00030 REM                                          RADAR DATA SYSTEMS
00040 REM                                          BY SHULENBERGER
00050 REM
00060 DIM NS!(8), EW!(8), TRACK!(8), ALT!(8), SPEED!(8), CLIMB!(8)
00070 OPEN "I",1,"TRACK 790"    REM    REF. AIRCRAFT (NORTH BOUND)
00080 OPEN "I",2,"TRACK 693"
00090 OPEN "I",3,"TRACK 6EA"
00100 OPEN "I",4,"TRACK 960"
00110 OPEN "I",5,"TRACK 6AE"
00120 OPEN "I",6,"TRACK 6E1"
00130 OPEN "I",7,"TRACK 6D4"
00140 OPEN "I",8,"TRACK 691"
00150 WINDOW #1,,(0,0)-(512,384)
00160 WINDOW OUTPUT #1
00170 COORDINATE WINDOW
00180 CIRCLE 256,256,30          REM    3 NM CIRCLE
00190 CIRCLE 256,256,50          REM    5 NM CIRCLE
```

```
00200 CIRCLE 256,256,100              REM      10 NM CIRCLE
00210 CIRCLE 256,256,200              REM      20 NM CIRCLE
00220 PLOT 103,0 TO 404,512
00230 PLOT 404,0 TO 103,512
00240 PLOT 0,108 TO 512,404
00250 PLOT 0,404 TO 512,108
00260 PLOT 0,256 TO 512,256
00270 PLOT 256,0 TO 256,512
00280 FOR C = 1 TO 24
00290   READ# 1, NSREF!, EWREF!, TRACKREF!, ALTREF!, SPEEDREF!, CLIMBREF!
00300   FOR B = 2 TO 8
00310     READ# B, NS!(B), EW!(B), TRACK!(B), SPEED!(B), ALT!(B), CLIMB!(B)
00320   NEXT B
00330   FOR B = 2 TO 8
00340     XPT = ((EW!(B)-EWREF!) * 10.0) + 256.0       REM 10 PIXELS/NM
00350     YPT = ((NS!(B)-NSREF!) * -10.0) + 256.0      REM OR 10 NM/CIRCLE
00360     CIRCLE FILL XPT,YPT,2
00370   NEXT B
00380   DELAY 10000
00390   COLOR 0
00400   FOR B = 2 TO 8
00410     XPT = ((EW!(B)-EWREF!) * 10.0) + 256.0
00420     YPT = ((NS!(B)-NSREF!) * -10.0) + 256.0
00430     CIRCLE FILL XPT,YPT,1
00440   NEXT B
00450   COLOR -1
00460 NEXT C
00470 CLOSE
00480 END
```

APPENDIX B

```
00010 REM
00020 REM                                           TRACK WRITER 11/4/87
00030 REM                                           RADAR DATA SYSTEMS
00040 REM
00050 DIM A(10),TIME!(50),ALT!(50),NS!(50),EW!(50)
00060 TIME!=0
00070 ALT!=0
00080 NS!=0
00090 EW!=0
00100 PI!=ATN(1)<<2
00110 OPEN "I",#1,"FILTER1"
00120 OPEN "O",#2,"TRACK 698"
00130 CODE$="0698"
00140 ADAPTER1$="F1C5"
00150 ADAPTER2$ = "C2C5"
00160 NUMSEC = 300
00170 L=1
00180 FOR P=1 TO 10
00190   READ#1,A(P)
00200 NEXT P
00210 TZERO! = A(10)/10.0
00220 DO
00230   IF INKEY$="S" THEN GOTO 310
00240   FOR P=1 TO 10
00250     READ#1,A(P)
00260   NEXT P
00270   IF (A(10)/10.0) > (TZERO! + 300.0) THEN GOTO 310
```

```
00280   IF HEX$(A(5))=CODE$ THEN GOSUB "WRITE LINE"
00290   TIMENOW! = A(10)/10.0
00300 UNTIL TIMENOW! - TZERO! => NUMSEC
00310 CLOSE
00320 END
00330 "WRITE LINE"
00340 RANGE! = (A(2)>>1)/8.0
00350 AZIMUTH! = (A(3)*360.0)/4096.0
00360 TIME!(L) = (A(10)/10.0) - TZERO!
00370 DTIME!=TIME!(L)-TIME!(L-1)
00380 ALT!(L) = A(7) MOD 4096/10.0
00390 NS!(L) = RANGE! * COS((PI!*AZIMUTH!)/180.0)
00400 EW!(L) = RANGE! * SIN((PI!*AZIMUTH!)/180.0)
00410 VEL! = 3600.0 * ((SQR((NS!(L)-NS!(L-1))^2 + (EW!(L)-EW!(L-1))^2)) / DTIME!)

00420 CLIMB!= 60000.0 * ((ALT!(L)-ALT!(L-1)) / DTIME!)
00430 IF L=1 GOTO 460
00440 GOSUB "CALCULATE HEADING"
00450 WRITE#1;NS!(L), EW!(L), HEADING!, VEL!, ALT!(L), CLIMB!
00460 L=L+1
00470 RETURN
00480 "CALCULATE HEADING"
00490 DELTA_X! = NS!(L) - NS!(L-1)
00500 DELTA_Y! = EW!(L-1) - EW!(L)
00510 RAWARC! = ATN (DELTA_Y!/DELTA_X!)
00520 PINUM! = 0
00530 IF DELTA_X!<0.0 THEN PINUM = 1
00540 IF DELTA_X!>0.0 AND DELTA_Y!<0.0 THEN PINUM = 2
00550 TRUEARC! = RAWARC! + (PINUM * PI!)
00560 HEADING! = TRUEARC! * (180.0/PI!)
00570 RETURN
```

What is claimed is:

1. A method for utilizing the common database of presently existing Air Traffic Control (ATC) facilities which include a search radar unit, a radio beacon unit and a common digitizer to track aircraft and aid collision avoidance, the steps of which comprise:

acquiring the data from the common digitizer without affecting the transmission of data to the ATC presently existing host computer, wherein azimuth and range information is acquired for all aircraft being tracked;

creating a plot message by filtering out non-positional data from the common database;

converting polar coordinates of the plot message to rectangular coordinates;

creating and encoding a data block from the plot message containing information on all aircraft being tracked by the ATC facility by using an auxiliary computer means;

reading the data block into temporary storage;

transmitting the data block to receiving stations;

receiving the data block at a receiving station;

decoding the data block; and displaying the data in human readable form.

2. A method for providing collision avoidance information, on board an aircraft being tracked that has a receiver on board, that utilizes the positional and identification information acquired and continually updated by an Air Traffic Control facility, with the positional and identification information including the azimuth, range, and transponder identification number information, including altitude, of all aircraft being tracked by an Air Traffic Control (ATC) facility, said method comprising the steps of:

encoding said positional and identification information into a data block suitable for transmission to an aircraft being tracked without affecting the use of the positional information by the host computer of the ATC facility;

transmitting said data block;

receiving said transmitted data block with a receiver on a particular aircraft being tracked;

processing said received data block, on said particular aircraft being tracked, to extract the positional and identification information of all aircraft being tracked; and analyzing, on board said particular aircraft being tracked, the extracted positional and identification information of all aircraft being tracked to provide collision avoidance information for said particular aircraft being tracked.

3. A method for utilizing, on board an aircraft being tracked that has a receiver on board, the positional and identification information acquired and continually updated by an Air Traffic Control facility for use by the host computer of the ATC facility, with the positional and identification information including the azimuth, range, and transponder identification number information, including altitude, of all aircraft being tracked by an Air Traffic Contrl (ATC) facility, said method comprising the steps of:

encoding said positional and identification information into a data block suitable for transmission to an aircraft being tracked without affecting the use of the positional information by the host computer of the ATC facility;

transmitting said data block;
receiving said transmitted data block with a receiver on a particular aircraft being tracked;
processing said received data block, on said particular aircraft being tracked, to extract the positional and identification information of all the aircraft being tracked; and
displaying said extracted information in human readable form.

4. A system for providing collision avoidance information on board an aircraft being tracked that has a receiver on board, with the system utilizing the positional and identification information acquired and continually updated by an Air Traffic Control facility for use by the host computer of the ATC facility, with the positional and identification information including the azimuth, range, and transponder identification number information, including altitude, of all aircraft being tracked by an Air Traffic Control (ATC) facility, said system comprising:

an encoder coupled to receive said positional and identification information for encoding said positional and identification information into a data block suitable for transmission to an aircraft being tracked without affecting the use of the positional information by the host computer of the ATC facility;
a transmitter, coupled to said encoder for receiving said data block from said encoder, for transmitting said data block;
a receiver, disposed on a particular aircraft being tracked, for receiving said transmitted data block; and
a processing unit, disposed on said particular aircraft, for processing said received data block to extract the positional and identification information of all aircraft being tracked from said received data block to provide collision avoidance information for said particular aircraft being tracked.

5. A system of claim 4 further comprising:
means for displaying said extracted information in human readable form.

* * * * *